US012555957B2

(12) United States Patent
Jakoplić et al.

(10) Patent No.: US 12,555,957 B2
(45) Date of Patent: Feb. 17, 2026

(54) ELECTRIC CONNECTOR ASSEMBLY, HIGH-VOLTAGE TERMINAL AND METHOD FOR ASSEMBLING

(71) Applicant: Yazaki Europe Ltd., Essex (GB)

(72) Inventors: Ivica Jakoplić, Krapinske Toplica (HR); Mario Šprljan, Velica Gorica (HR)

(73) Assignee: Yazaki Europe Ltd., Essex (GB)

( * ) Notice: Subject to any disclaimer, the term of this patent is extended or adjusted under 35 U.S.C. 154(b) by 395 days.

(21) Appl. No.: 18/297,074

(22) Filed: Apr. 7, 2023

(65) Prior Publication Data

US 2023/0327376 A1 Oct. 12, 2023

(30) Foreign Application Priority Data

Apr. 12, 2022 (EP) .................................... 22168002

(51) Int. Cl.

*H01R 13/639* (2006.01)
*H01R 13/18* (2006.01)
*H01R 13/627* (2006.01)
*H01R 24/86* (2011.01)

(52) U.S. Cl.

CPC ........... *H01R 13/639* (2013.01); *H01R 13/18* (2013.01); *H01R 13/6271* (2013.01); *H01R 24/86* (2013.01)

(58) Field of Classification Search

None

See application file for complete search history.

(56) References Cited

U.S. PATENT DOCUMENTS

| | | | | |
|---|---|---|---|---|
| 4,128,293 | A | 12/1978 | Paoli | |
| 5,588,852 | A * | 12/1996 | Puerner | H01R 13/44 439/752 |
| 6,113,436 | A | 9/2000 | Kuwahara et al. | |
| 7,520,772 | B2 * | 4/2009 | Hanks | H01R 4/5083 439/393 |
| 9,444,205 | B2 | 9/2016 | Rangi et al. | |
| 10,535,948 | B2 * | 1/2020 | Mori | H01R 13/44 |
| 11,848,516 | B2 * | 12/2023 | Scheer | H01R 13/17 |
| 2019/0348790 | A1 | 11/2019 | Mori | |
| 2019/0348802 | A1 | 11/2019 | Yamanashi | |
| 2023/0054340 | A1 * | 2/2023 | Zheng | H01R 24/52 |

FOREIGN PATENT DOCUMENTS

| | | | |
|---|---|---|---|
| EP | 3 035 448 | A1 | 6/2016 |
| EP | 3 570 382 | A1 | 11/2019 |
| JP | 2000-3750 | A | 1/2000 |
| JP | 2007-26705 | A | 2/2007 |
| JP | 2019-200843 | A | 11/2019 |

OTHER PUBLICATIONS

Extended European Search Report for EP 22168002.8 dated Sep. 26, 2022.

* cited by examiner

*Primary Examiner* — Ross N Gushi
(74) *Attorney, Agent, or Firm* — Sughrue Mion, PLLC

(57) ABSTRACT

An electric connector assembly for a high-voltage terminal including a contact tube made of electroconductive material, a high-voltage terminal comprising an electric connector assembly and a busbar made of electroconductive material, and a method for assembling a high-voltage terminal.

12 Claims, 2 Drawing Sheets

A-A

ELECTRIC CONNECTOR ASSEMBLY, HIGH-VOLTAGE TERMINAL AND METHOD FOR ASSEMBLING

TECHNICAL FIELD

This disclosure relates to an electric connector assembly for a high-voltage terminal comprising a contact tube made of electroconductive material, to a high-voltage terminal comprising an electric connector assembly and a busbar made of electroconductive material, and to a method for assembling a high-voltage terminal.

BACKGROUND

Electric connectors and high-voltage terminals are used to establish electric connections between components. For example, electric connectors are used in electrical circuits between components in a power distribution box or to connect a wiring harness to an electrical device. Electrical connectors typically include electrically conductive parts, which engage a corresponding terminal. To prevent accidental contact with the electrically conductive parts, electric connectors may further comprise protective parts made of dielectric material.

U.S. Pat. No. 9,444,205 B2 discloses an electric connector including a connector body and a conductor base attached to the connector body. A plurality of contact arms extend from the conductor base away from the connector body and are located around a central space. The electric connector also includes a pin attached to the connector body and located in the central space, which pin may be made of electrically non-conductive plastic.

It can be an objective to improve an electric connector assembly for a high-voltage terminal with regard to facilitated assembly.

SUMMARY

According to an aspect, the electric connector assembly for a high-voltage terminal comprises:

- a contact tube made of electroconductive material having a central cavity extending along a longitudinal axis (L), the contact tube having a front end with an access opening towards the central cavity for receiving a male terminal, and a rear end with a connection portion;
- a contact spring made of electroconductive material having a plurality of spring arms, the contact spring being arranged in the central cavity; and
- a protective pin made of dielectric material arranged in the central cavity, the protective pin having a locking portion adapted to establish a positive locking with the connection portion of the contact tube.

It is an advantage that the protective pin can be directly attached to the contact tube, which facilitates assembly of the connector assembly. It is a further advantage that the protective pin can be inserted into the central cavity of the contact tube through the access opening at the front end. The positive locking can advantageously be established as a snap-fit connection. The protective pin advantageously prevents inadvertent contact to the electroconductive contact spring or contact tube inside the central cavity. The person skilled in the art is aware that the electric connector assembly may comprise protective cover made of dielectric material to prevent inadvertent contact to the outer surface of the contact tube.

The contact tube may have the form of a hollow cylinder, although other cross sections perpendicular to the longitudinal axis than round may be applicable as well. The contact spring may have a generally tubular shape as well, which is advantageously adapted to the central cavity, wherein the plurality of spring arms can be aligned in parallel to the longitudinal axis. Alternatively, the spring arms can extend parallel to each other and spirally around the longitudinal axis. The protective pin may extend along the longitudinal axis inside the contact tube. The contact tube, the contact spring and the protective pin may be concentrically arranged to each other and to the longitudinal axis, respectively. The protective pin may extend throughout the full length of the central cavity, a tip end of the protective pin having the identical position along the longitudinal axis as the access opening at the front end. The locking portion of the protective pin is arranged at an opposite rear end of the protective pin.

According to an embodiment, the connection portion may comprise a collar protruding inward to form a rear opening that is narrower than the central cavity. The rear opening may have a round cross section, and the diameter of the rear opening may be smaller than an inner diameter of the central cavity. The locking portion of the protective pin comprises a body adapted to fit into the rear opening. For example, both the body and the rear opening have a round cross section, which is beneficial for the assembly process as the positive locking can be established irrespective of the relative rotation positions of the body and the rear opening around the longitudinal axis. The body can be inserted into the rear opening with a clearance fit. A flange with a greater diameter than the body protrudes from the body to abut against the collar. At least one locking arm is deflectably attached to the body, which for example extends cantilevered towards the rear end of the protective pin. Two or more locking arms may be evenly distributed around a circumference of the body. The locking arm has near its free end a hook portion extending radially outward and a ramp chamfering radially inward towards the free end. When the body is inserted into the rear opening, the ramp engages the collar, which deflects the locking arm to retreat inside an outer perimeter of the body. When the flange abuts against the collar, the least one locking arm extends through the rear opening, wherein at least the hook portion extends beyond the rear opening. The inwardly biased locking arm snaps back outward to engage the collar with the hook portion at a side of the collar opposite the side abutted to the flange. The flange abuts against the collar inside the central cavity and the at least one locking arm engages the collar at its side facing away from the central cavity, although the protective pin could also be inserted through the rear opening at the rear end of the contact tube.

The central cavity is defined by an inner surface of the contact tube. According to a further embodiment, the central cavity has a first section and a second section, wherein the first section is wider than the second section, the contact spring being arranged in the first section of the central cavity. The first section can be formed as a notch in the inner surface, with notch sidewalls forming abutments for restraining the contact spring. A notch depth is essentially smaller than a notch width. The notch width corresponds to a length of the contact spring along the longitudinal axis.

According to a further embodiment, the contact spring has at least one open ring with a gap, the spring arms extending in parallel to the longitudinal axis from the ring. The contact spring may have two open rings, with the spring arms extending in parallel to the longitudinal axis between the rings. The gap extends, for example over a portion of a circumference of the ring of 5% to 30%, in particular of about 15%.

The high-voltage terminal comprises an electric connector assembly as described herein and a busbar made of electroconductive material. The busbar has a reception opening. The connection portion has a rim forming an outer surface that fits into the reception opening. The rim can be press-fittingly inserted into the reception opening to establish a mechanically fixed and electrically conductive connection. The electric connector assembly is a sub-assembly of the high-voltage terminal.

The Method for assembling a high-voltage terminal comprises the steps of providing a contact tube made of electroconductive material having a central cavity extending along a longitudinal axis L, the contact tube having a front end with an access opening towards the central cavity for receiving a male terminal, and a rear end with a connection portion;

- providing a protective pin made of dielectric material, the protective pin having a locking portion;
- inserting the protective pin into the central cavity; and
- establishing a positive locking of the locking portion at the connection portion of the contact tube.

According to an embodiment, the protective pin is inserted into the central cavity with the locking portion ahead through an access opening at a front end of the contact tube until a the locking portion contacts a collar forming a rear opening that is narrower than the central cavity. Subsequently, a body of the locking portion is pushed into the rear opening, thereby deflecting at least one locking arm inside an outer perimeter of the body until a flange protruding from the body abuts against the collar and the at least one locking arm extends through the rear opening to engage the collar opposite to the flange.

The method may further comprise the steps of

- providing a contact spring made of electroconductive material having a plurality of spring arms;
- tensioning the tubular contact spring to reduce its diameter to fit through the access opening,
- inserting the contact spring into the central cavity through the access opening; and expanding the contact spring in a first section of the central cavity, the first section being wider than a second section, the contact spring being expanded to a diameter that restrains the contact spring to in the first section of the central cavity. The steps may commonly be carried out after establishing the positive locking of the protective pin, although other sequences may be applicable as well.

The method may further comprise the steps of

- providing a busbar made of electroconductive material, the busbar having a reception opening and press-fittingly inserting a rim of the connection portion into the reception opening. The steps may commonly be carried out before establishing the positive locking of the protective pin and expanding the contact spring in the central cavity, although other sequences may be applicable as well.

Various aspects will become apparent to those skilled in the art from the following detailed description of an exemplary embodiment, when read in light of the accompanying drawings.

DETAILED DESCRIPTION

Figure 1:
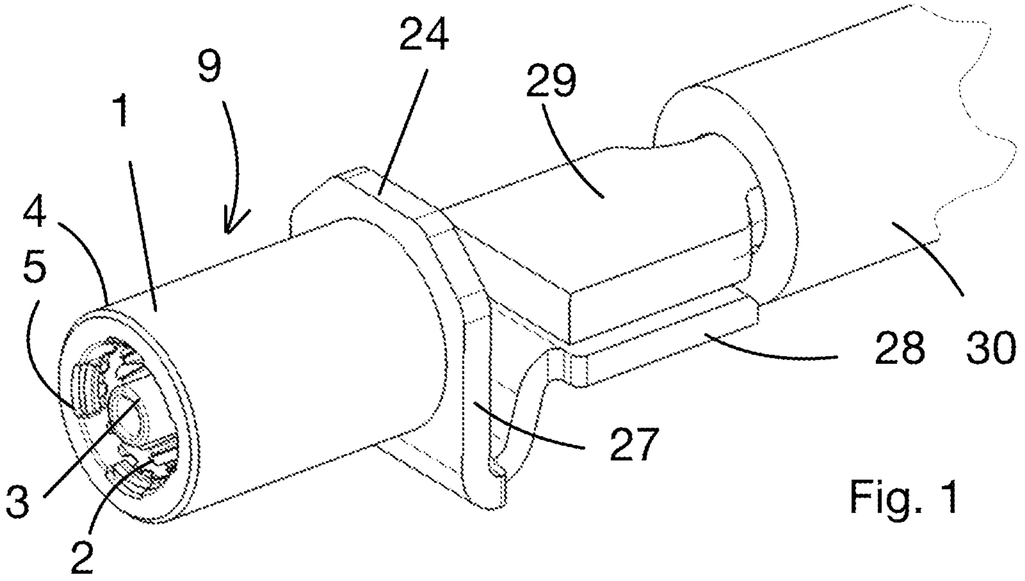
FIG. 1 is a perspective view of a high-voltage terminal with an electric connector assembly.
Figure 2:
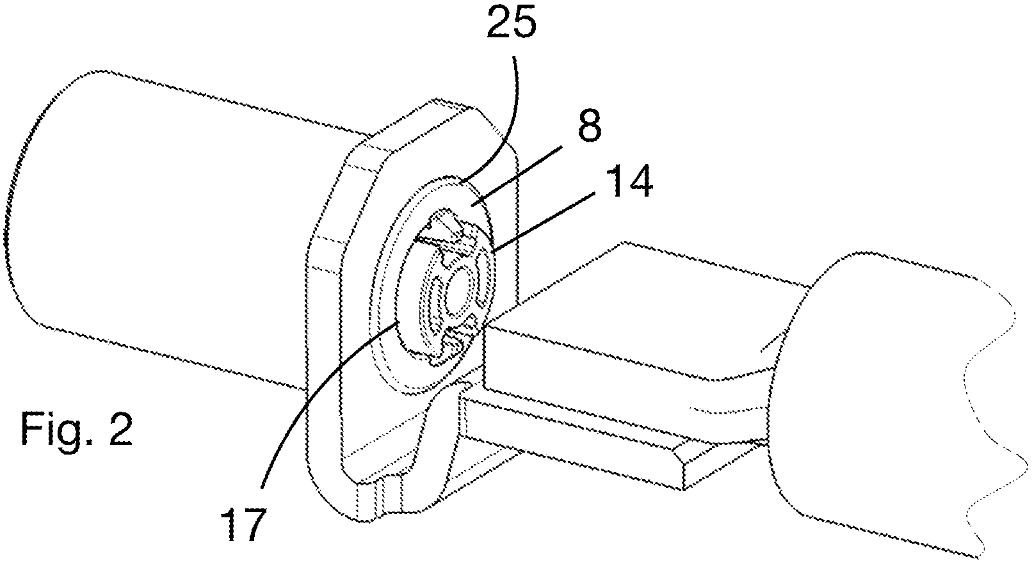
FIG. 2 is a further perspective view of the high-voltage terminal of FIG. 1.

FIGS. 1 through 6 show an embodiment of a high-voltage terminal comprising an electric connector assembly 9. FIGS. 1 through 6 will be described together. The high-voltage terminal has a busbar 24 made of electroconductive material, the busbar having a first base 27 with a reception opening 25 and a second base 28, which can be connected to a conductor 29 of a wire 30. The electric connector assembly 9 has a connection portion 8 with a rim 26 forming an outer surface that fits into the round reception opening 25. The rim 26 can be press-fittingly inserted into the reception opening 25 without regard of their relative rotational positions about a common longitudinal axis L.

The electric connector assembly 9 of the high-voltage terminal comprises a contact tube 1 made of electroconductive material having a central cavity 6 extending along a longitudinal axis L, the contact tube 1 having a front end 4 with an access opening 5 towards the central cavity 6 for receiving a male terminal (not depicted), and a rear end 7 with the connection portion 8; further a contact spring 2 made of electroconductive material having a plurality of spring arms 12, the contact spring 2 being arranged in the central cavity 6; and further yet a protective pin 3 made of dielectric material arranged in the central cavity 6, the protective pin 3 having a locking portion 14 adapted to establish a positive locking with the connection portion 8 of the contact tube 1. The connection portion 8 comprises a collar 15 protruding inward to form a rear opening 17 that is narrower than the central cavity 6. The contact tube 1 has generally the form of a hollow cylinder, wherein a diameter of the rim 26 at the connection portion 8 is smaller than a diameter of the rest of the contact tube 1.

Figure 3:
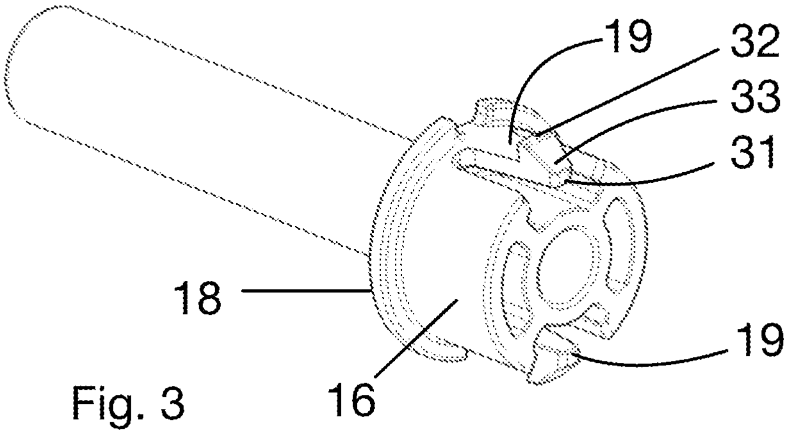
FIG. 3 is a perspective view of a protective pin as a detail of the high-voltage terminal of FIG. 1.

The protective pin 3 is depicted in FIG. 3 as a detail. The locking portion 14 of the protective pin 3 comprises a body 16 adapted to fit into the round rear opening 17. A flange 18 protrudes from the body 16 to abut against the collar 15. In the embodiment, two cantilevered locking arms 19 are attached to the body 16, which are deflectable. The locking arms 19 each have a hook 32 near their free ends 31, extending radially outward, and a ramp 33 chamfering radially inward towards the respective free end 31. When the body 16 is inserted into the rear opening 17, the ramp 33 engages the collar 15, which deflects the locking arms 19 to retreat inside an outer perimeter of the body 16. When the flange 18 abuts against the collar 15, the locking arms 19 extend through the rear opening 17, the free ends 31 extending beyond the rear opening 17. The inwardly biased locking arms 19 snap back outward to engage the collar 15 with the hooks 32 from outside the central cavity 6, thus positively locking the protective pin 6 to the contact tube 6.

Figure 4:
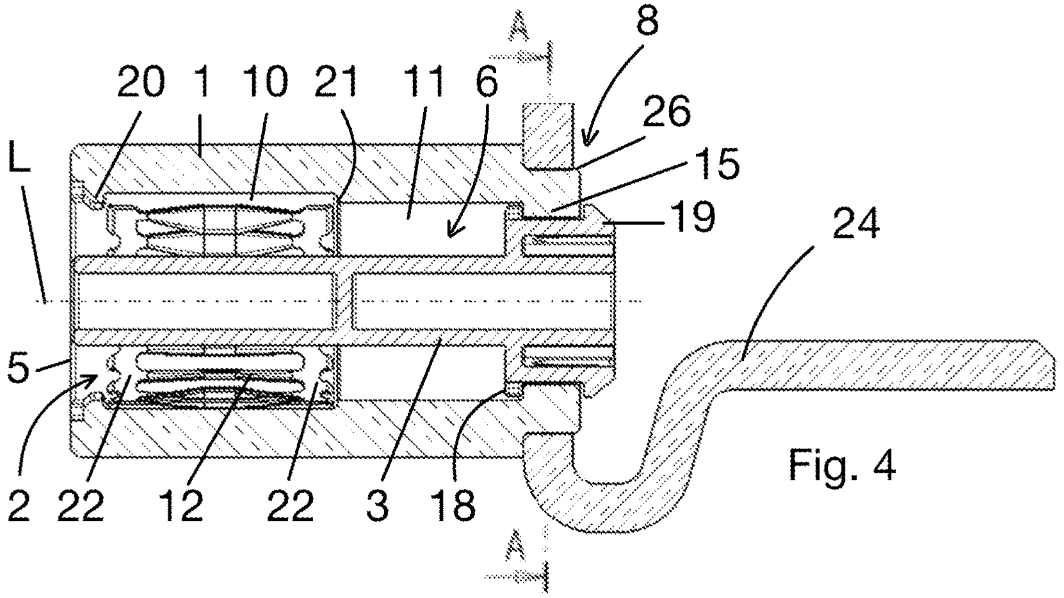
FIG. 4 is a section along a longitudinal axis of the high-voltage terminal of FIG. 1.
Figure 5:
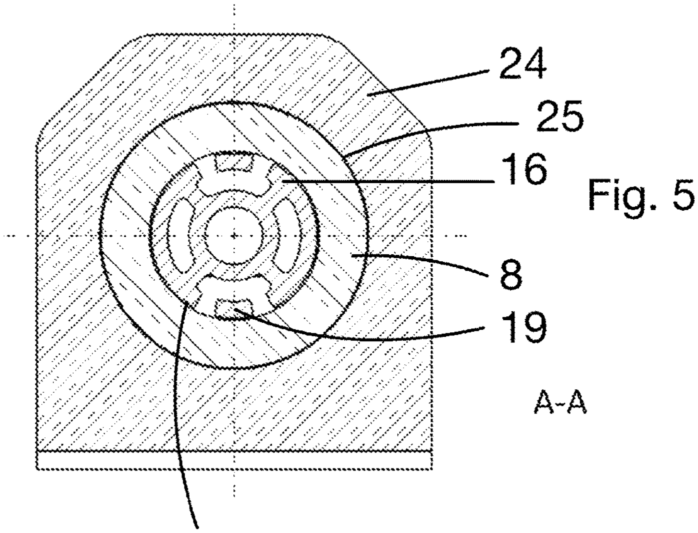
FIG. 5 is a cross section of the high-voltage terminal along a line A-A in FIG. 4.

The central cavity 6 is defined by an inner surface of the contact tube 1, which is best seen in the sectional view of FIG. 4. The central cavity has a first cylindrical section 10 and a second cylindrical section 11, wherein a diameter of the first section 10 is wider than a diameter of the second section 11. The contact spring 2 is arranged in the first section 10 of the central cavity 6. The first section 10 is formed as a notch in the inner surface, notch sidewalls 20, 21 forming abutments for restraining the contact spring 2 to the first section. The contact spring 2, which is best seen in the exploded view of FIG. 6, has two open rings 22 with a gap 23. The spring arms 12 extend in parallel to the longitudinal axis L between the rings 22. The gaps 23 may extend over a portion of a circumference of the rings 22 of about 15%, which allows to reduce a diameter of the contact spring 2 by tensioning.

Figure 6:
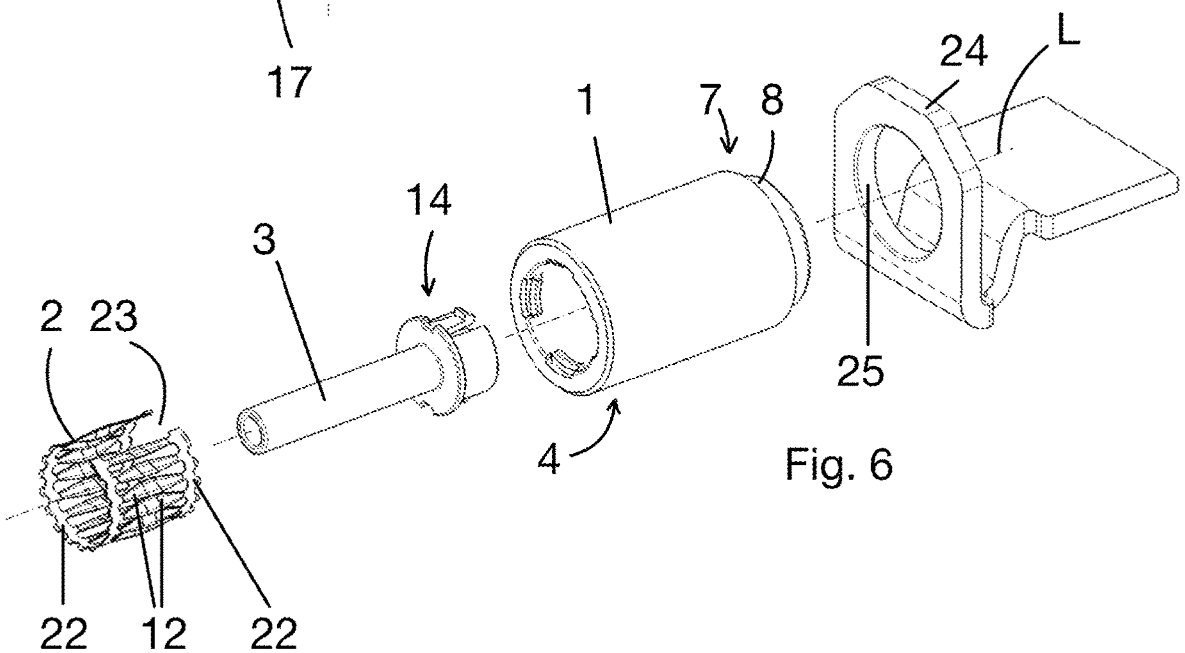
FIG. 6 is an exploded view of the high-voltage terminal of FIG. 1.

An exemplary method for assembling the high-voltage terminal is described with regard to FIG. 6. First, the busbar 24 and the contact tube 1 are provided, which are mated by inserting the rim 26 of the connection portion 8 into the reception opening 25, for example by press-fitting. Subsequently, the protective pin 3 is provided, which is inserted into the central cavity 6 with the locking portion 14 ahead through the access opening 5 at the front end 4 of the contact tube 1 until a the locking portion 14 abuts against the collar 15. The positive locking of the locking portion 14 at the connection portion 8 of the contact tube 1 is established by the locking arms 19, which snap-fittingly engage the collar 15 from outside the central cavity 6 with the hooks 32. Subsequently, the contact spring 2 is provided, which is tensioned to reduce its diameter to fit through the access opening 5, and inserted into the central cavity 6 through the access opening 5. Inside the central cavity, the contact spring 2 is expanded in the first section 10 to its original diameter. The diameter of the second section 11 is smaller than the original diameter of the contact spring 2, so that the contact spring 2 is restrained to in the first section 10 of the central cavity 6. The person skilled in the art is aware that the method can be executed in various sequences, for example, first assembling the electric connector assembly 9, before it is subsequently mated with the busbar 24.

Those with ordinary skill in the art will appreciate that various modifications and alternatives for the described and illustrated embodiments can be developed in light of the overall teachings of the disclosure, and that the various elements and features of one example described and illustrated herein can be combined with various elements and features of another example without departing from the scope of the invention. Accordingly, the particular examples disclosed herein have been selected to describe and illustrate examples of the invention and are not intended to limit the scope of the invention or its protection, which is to be given the full breadth of the appended claims and any and all equivalents thereof.

REFERENCE NUMERALS

1 Contact tube
2 Contact spring
3 Protective pin
4 Front end
5 Access opening
6 Central cavity
7 Rear end
8 Connection portion
9 Electric connector assembly
10 First section
11 Second section
12 Spring arms
14 Locking portion
15 Collar
16 Body
17 Rear opening
18 Flange
19 Locking arm
20 Sidewall
21 Sidewall
22 Ring
23 Gap
24 Busbar
25 Reception opening
26 Rim
27 First base
28 Second base
29 Conductor
30 Wire
31 Free end
32 Hook
L Longitudinal axis

The invention claimed is:

1. An electric connector assembly for a high-voltage terminal comprising:

a contact tube made of electroconductive material having a central cavity extending along a longitudinal axis, the contact tube having a front end with an access opening towards the central cavity for receiving a male terminal, and a rear end with a connection portion;

a contact spring made of electroconductive material having a plurality of spring arms, the contact spring being arranged in the central cavity; and a protective pin made of dielectric material arranged in the central cavity, the protective pin having a locking portion adapted to establish a positive locking with the connection portion of the contact tube, wherein the connection portion comprises a collar protruding inward to form a rear opening that is narrower than the central cavity, wherein the locking portion of the protective pin comprises a body adapted to fit into the rear opening, a flange protruding from the body to abut against the collar and at least one locking arm deflectably attached to the body, the at least one locking arm extending through the rear opening out of the central cavity to engage the collar opposite to the flange, and wherein the flange abuts against the collar inside the central cavity and the at least one locking arm engages the collar at its side facing away from the central cavity.

2. The electric connector assembly according to claim 1, wherein the contact spring has at least one open ring with a gap, the spring arms extending in parallel to the longitudinal axis from the ring.

3. The electric connector assembly according to claim 1, wherein the contact spring has two open rings, the spring arms extending in parallel to the longitudinal axis L between the rings.

4. A high-voltage terminal comprising an electric connector assembly according to claim 1 and a busbar made of electroconductive material, the busbar having a reception opening, the connection portion having a rim forming an outer surface that fits into the reception opening.

5. The high-voltage terminal according to claim 4, wherein the rim is press-fittingly inserted into the reception opening.

6. The electric connector assembly according to claim 1, wherein the central cavity is defined by an inner surface of the contact tube, wherein the central cavity has a first section and a second section, wherein the first section is wider than the second section, the contact spring being arranged in the first section of the central cavity.

7. The electric connector assembly according to claim 1, wherein the first section is formed as a notch in the inner surface, notch sidewalls forming abutments for restraining the contact spring.

8. The electric connector assembly according to claim 1, wherein the gap extends over a portion of a circumference of the ring of 5% to 30%.

9. A method for assembling a high-voltage terminal comprising the steps:

providing a contact tube made of electroconductive material having a central cavity extending along a longitudinal axis L, the contact tube having a front end with an access opening towards the central cavity for receiving a male terminal, and a rear end with a connection portion;

providing a protective pin made of dielectric material, the protective pin having a locking portion;

inserting the protective pin into the central cavity with the locking portion ahead through an access opening at a front end of the contact tube until the locking portion contacts a collar forming a rear opening that is narrower than the central cavity; and establishing a positive locking of the locking portion at the connection portion of the contact tube.

10. The method according to claim 9, wherein the protective pin is inserted into the central cavity with the locking portion ahead through an access opening at a front end of the contact tube until the locking portion contacts a collar forming a rear opening that is narrower than the central cavity, wherein subsequently a body of the locking portion is pushed into the rear opening, thereby deflecting at least one locking arm inside an outer perimeter of the body until a flange protruding from the body abuts against the collar and the at least one locking arm extends through the rear opening to engage the collar opposite to the flange.

11. The method according to claim 9, further comprising the steps of providing a contact spring made of electroconductive material having a plurality of spring arms, tensioning the tubular contact spring to reduce its diameter to fit through the access opening, inserting the contact spring into the central cavity through the access opening;

expanding the contact spring in a first section of the central cavity, the first section being wider than a second section, the contact spring being expanded to a diameter that restrains the contact spring to in the first section of the central cavity.

12. The method according to claim 9, further comprising the steps of providing a busbar made of electroconductive material, the busbar having a reception opening, press-fittingly inserting a rim of the connection portion into the reception opening.

* * * * *